Nov. 17, 1953 D. L. CURTIS 2,659,815

ELECTRICAL GATING CIRCUITS

Filed Oct. 30, 1951 5 Sheets-Sheet 1

INVENTOR.
DANIEL L. CURTIS,
BY Nicholas T Volsk
ATTORNEY.

Nov. 17, 1953 D. L. CURTIS 2,659,815

ELECTRICAL GATING CIRCUITS

Filed Oct. 30, 1951 5 Sheets-Sheet 2

INVENTOR.
DANIEL L. CURTIS,
BY Nicholas T Volsk
ATTORNEY.

INVENTOR.
DANIEL L. CURTIS,
BY Nicholas T Volk
ATTORNEY.

INVENTOR.
DANIEL L. CURTIS,
BY Nicholas T Volk.
ATTORNEY.

Nov. 17, 1953 D. L. CURTIS 2,659,815

ELECTRICAL GATING CIRCUITS

Filed Oct. 30, 1951 5 Sheets-Sheet 5

INVENTOR.
DANIEL L. CURTIS,
BY Nicholas T. Volna
ATTORNEY.

Patented Nov. 17, 1953

2,659,815

UNITED STATES PATENT OFFICE 2,659,815

ELECTRICAL GATING CIRCUITS

Daniel L. Curtis, Venice, Calif., assignor to Hughes Tool Company, Houston, Tex., a corporation of Delaware Application October 30, 1951, Serial No. 253,903

18 Claims. (Cl. 250—27)

This invention relates to electrical gating circuits and more particularly to electrical gating circuits employing neon tubes.

Gating circuits have found widespread application in electronic fields and many types have been developed to perform various gating functions. In particular, the gating function wherein a pulse is to be passed or blocked upon the occurrence of non-occurrence of a gating signal, respectively, has been provided for by pentode circuits, vacuum tube diode circuits, crystal diode circuits, triode circuits, and other types of circuits. The majority of these gating circuits have proved satisfactory for the gating operations intended, but all lack the ultimate in reliability owing to the unpredictability of vacuum tube or crystal diode life.

This invention provides gating circuits performing the function set forth above which employ neon tubes as their primary component. One commercially available neon tube is rated at 25,000 hours of active conduction which, when considered with the fact that a neon tube in such a gating circuit will conduct only intermittently, provides an exceptionally high degree of reliability, comparable to such circuit components as resistors and capacitors. Such reliability appreciably decreases the maintenance and service cost of gating circuits so constructed.

Another advantage gained by utilizing gating circuits according to the present invention lies in the relatively low initial cost of such neon tubes as compared with the before-mentioned diodes, triodes, pentodes, etc. Thus, the financial saving will be appreciable when gating circuits are utilized in a device such as a digital computer, where an extremely large number will be required. Also, in applications involving airborne equipment, the saving in weight and size by employing neon tube gating circuits will likewise be considerable.

The gating circuits according to the present invention utilize the constant voltage characteristic of neon tubes. The gating signals are applied across the electrodes of the neon tube through a resistor and the ensuing conduction, during the interval of each gating pulse, opens the gating circuit. The input pulses to the gating circuit are applied between one electrode of the neon tube and ground and any input pulse occurring during the time interval the gating circuit is open is passed by the circuit and appears between the other electrode of the tube and ground. All other input pulses are blocked by the gating circuit, owing to the open circuit behavior of the neon tube when non-conducting.

In the majority of commercially available neon tubes, the firing potential, that is the potential at which conduction is initiated, is greater than the normal conducting potential. This difference of potential between the firing and conducting potentials is greatest for cold neon tubes, that is neon tubes which have not recently been conducting, and is much smaller for neon tubes which have only recently ceased conduction. In the former case, spurious output pulses are produced whenever the neon tube fires as when, for example, the gating circuit opens. The neon tube gating circuits are thus unsatisfactory when the gating signals are of infrequent occurrence.

However, in applications where the gating signals recur rapidly, as might be the case in high speed digital computer applications, gating circuits composed of these neon tubes perform satisfactorily and produce no undesired or spurious output pulse upon each firing of the neon tube. Gating circuits employing ideal neon tubes whose firing and conducting potentials are very close together are satisfactory for both infrequently and frequently occurring gating signals.

The present invention also provides circuitry for use with the type of neon tube most readily commercially available which enables these tubes to operate satisfactorily in neon gating circuits having infrequently occurring gating signals. This is done, in one instance, by applying a potential to a conductive coating on the glass envelope of the neon tube, the potential being of such polarity and magnitude as to speed conduction therein by producing ionization of the neon gas molecules separate and distinct from the ionization produced by the applied gating signal. One suitable conductive coating is "Aquadag," a colloidal dispersion of finely ground graphite manufactured by the Acheson Colloids Company of Port Huron, Michigan. In another instance, means are disclosed by the present invention to produce this additional ionization by employing a radio-frequency electromagnetic field in the vicinity of the tube, the field continuously maintaining ionization of the neon gas in such amount as to allow firing of the tube at a potential just above its normal conducting potential upon application of the gating signal. In still another instance, a quantity of radioactive material, placed adjacent the neon tube, produces ionization of a portion of the gas molecules whereby the applied gating signal produces conduction through the tube at a potential just above the conduction potential thereof.

This invention also discloses a combination of "and" and "or" gating circuits employing neon tubes and constructed according to the principles of the present invention wherein gating operations may be had at infrequently occurring gating signals.

It is, therefore, an object of this invention to provide an electrical gating circuit composed of neon tubes for passing and blocking electrical input pulses upon the occurrence and non-occurrence of electrical gating signals, respectively.

Another object of this invention is to provide an electrical gating circuit including a neon tube and responsive to an electrical gating signal applied across the tube to fire the tube and open the gate.

Still another object of this invention is to provide an electrical gating circuit including a serially-connected neon tube and resistor, said tube being responsive to an electrical gating signal applied across the series combination to fire and allow any input signal applied to one of its electrodes to appear as an output pulse on its other electrode.

A further object of this invention is to provide an electrical gating circuit employing a neon tube for use at infrequently occurring gating signals by producing ionization of the neon gas within the tube in addition to the ionization produced by application of a gating signal across the electrodes of the neon tube whereby the tube fires at a potential only slightly in excess of its normal conducting potential.

A still further object of this invention is to provide a gating circuit employing a neon tube for use at infrequently occurring gating signals by producing extra ionization within the tube by application of a potential of correct magnitude and polarity to an "aquadag" coating on the glass envelope of the neon tube simultaneously with the occurrence of each gating signal whereby the tube fires at a potential only slightly in excess of its normal conducting potential.

Another object of this invention is to provide a neon tube gating circuit for use at infrequently occurring gating signals by ionizing a portion of the neon gas molecules therein by applying radio-frequency energy thereto whereby the tube fires upon the gating signal attaining a potential only slightly in excess of the normal conducting potential of the tube.

Another object of this invention is to provide a neon tube gating circuit for use at infrequently occurring gating signals by continuously ionizing a portion of the neon gas molecules within the neon tube by a radioactive substance whereby the tube fires whenever the gating signal reaches a potential only slightly in excess of the normal conducting potential of the tube.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
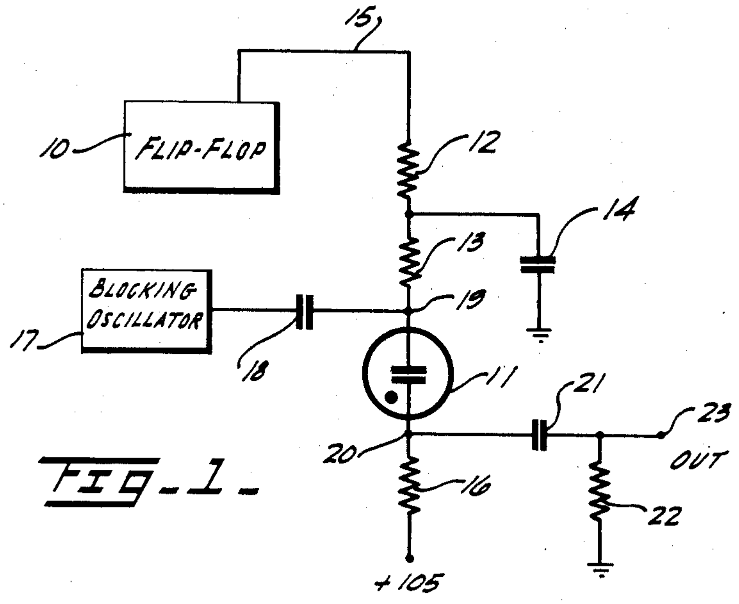
Fig. 1 is a circuit diagram of one form of a neon gating circuit according to the present invention.
Figure 4:
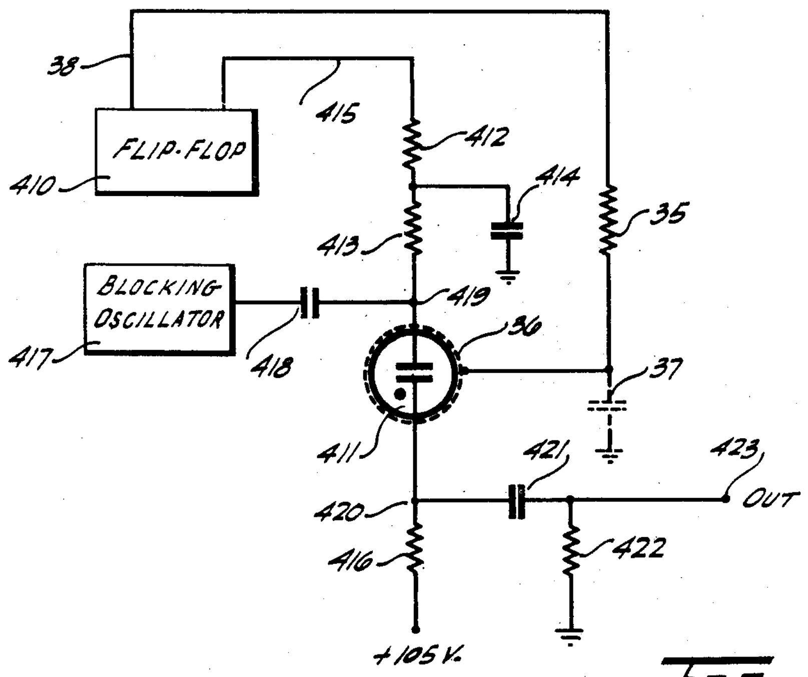
Figure 5:
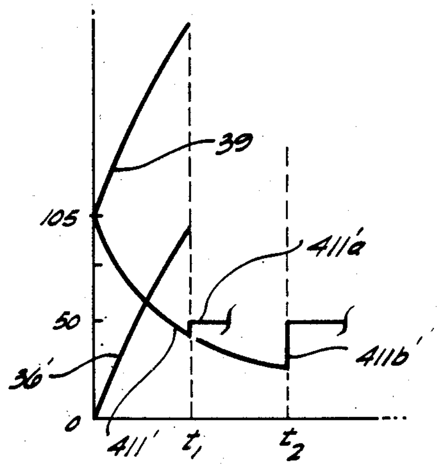
Figure 6:
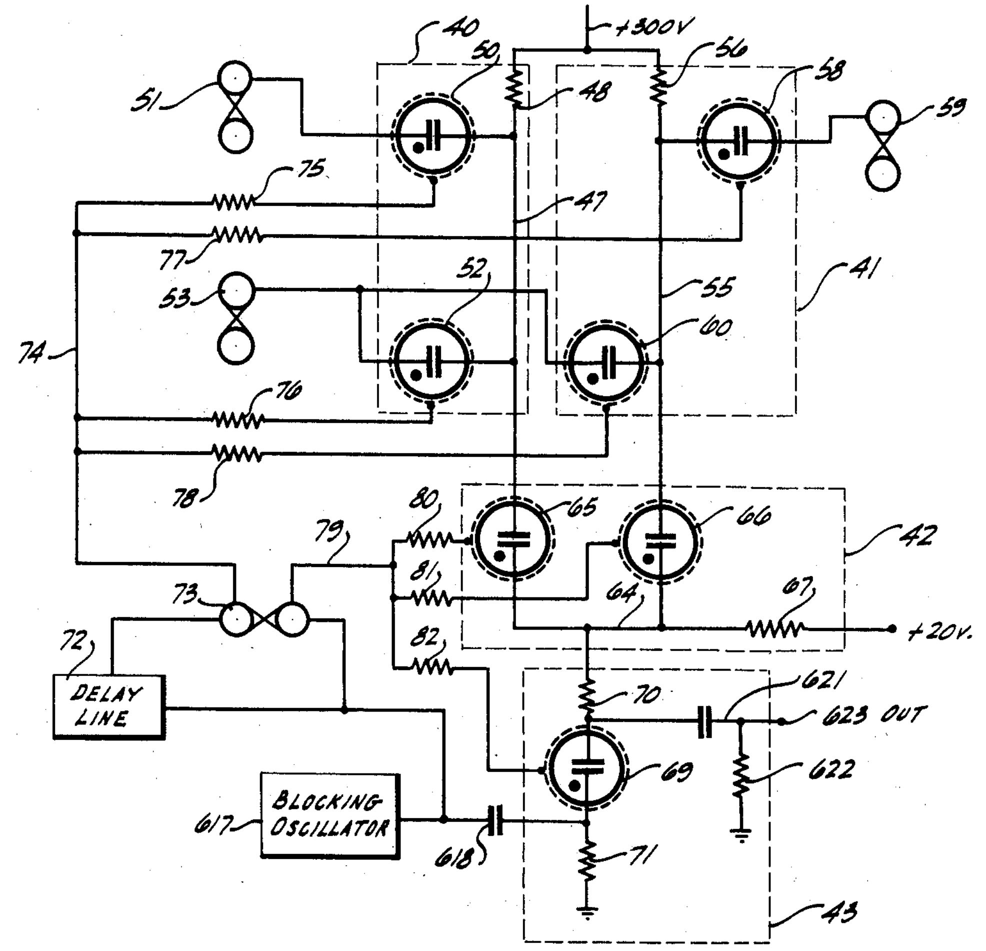
Figure 8:
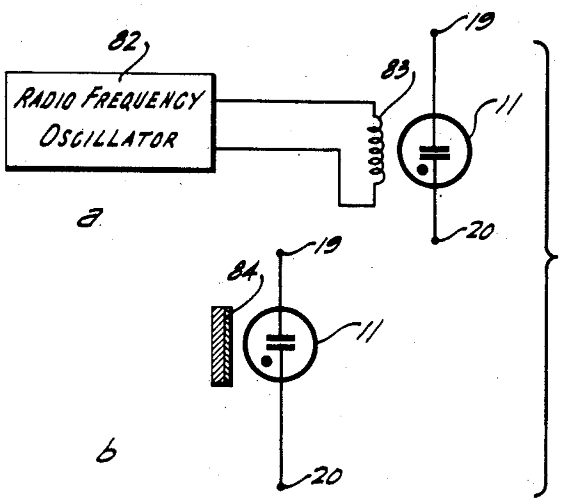
Figure 7:
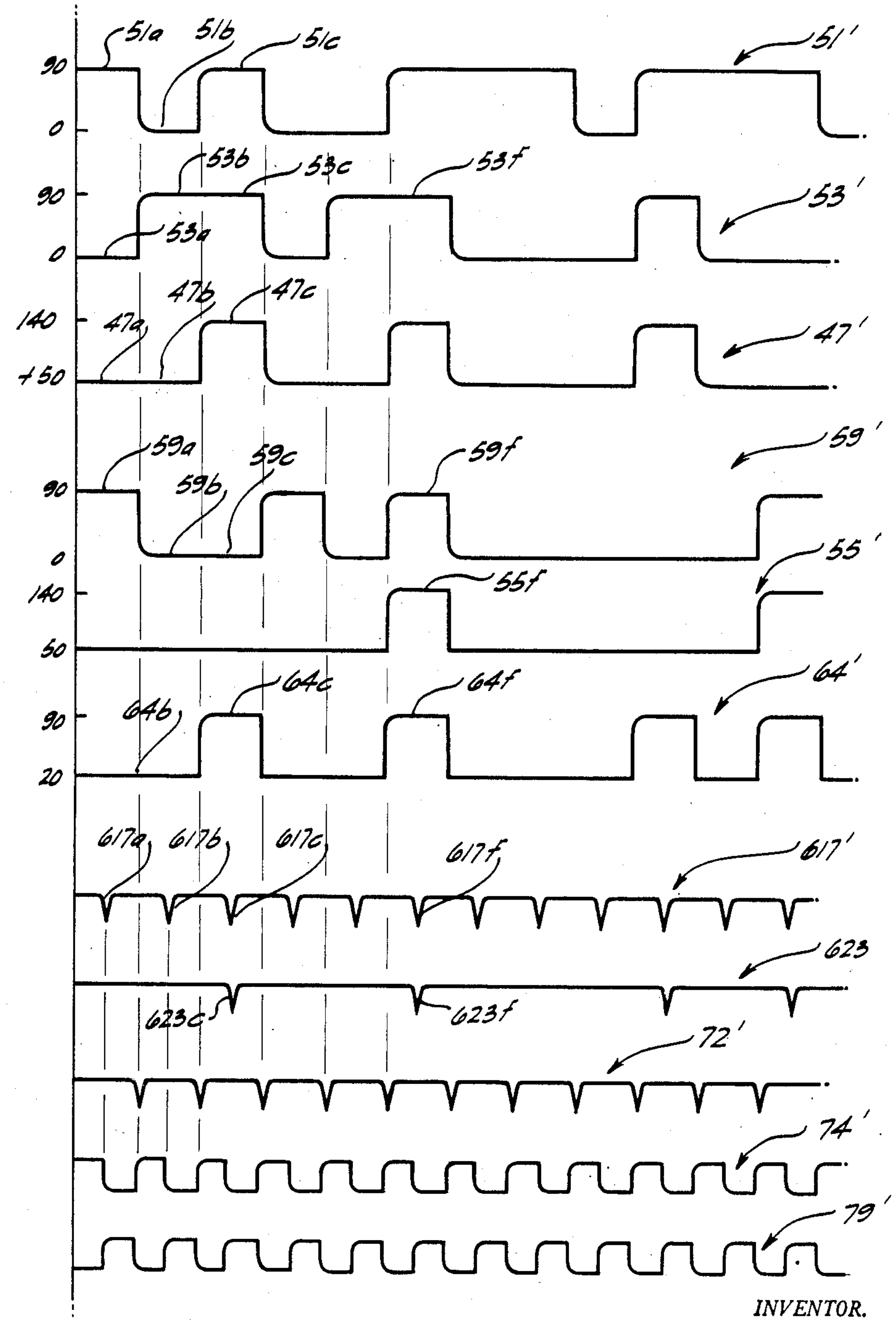

Figs. 3*a*–3*h* are a group of waveforms of the signals appearing at various points in the circuit of Fig. 1;

Fig. 4 is a circuit diagram of another embodiment of a neon gating circuit according to the present invention;

Fig. 5 is a group of potential waveforms illustrating the firing behavior of the neon tube within the gating circuit of Fig. 4;

Fig. 6 is a circuit diagram of a combination of neon gating circuits according to the present invention;

Fig. 7 is a group of waveforms of the signals appearing at various points in the circuit of Fig. 6; and Figs. 8*a* and 8*b* are schematic diagrams of a portion of the circuit of Fig. 1 disclosing other embodiments of the present invention.

Referring now to Fig. 1, there is illustrated one embodiment of a neon tube gating circuit according to the present invention. One output terminal of a device for producing alternate high and low voltage levels, such as a flip-flop 10, is connected to one electrode of a gaseous discharge tube, such as neon tube 11, through a conductor 15 and a pair of resistors 12 and 13. A decoupling capacitor 14 is coupled between the common junction of resistors 12 and 13 and ground. The other electrode of neon tube 11 is connected through a resistor 16 to the positive terminal of a source (not shown) of direct-current potential, the other terminal of the source being grounded. The voltage of the source may be, for example, 105 volts. The output terminal of a negative pulse source, such as blocking oscillator 17, is connected through coupling capacitor 18 to the point of junction 19 of resistor 13 and neon tube 11. A differentiating circuit, comprising a series capacitor 21 and a shunt resistor 22, is connected to the junction point 20 of resistor 16 and neon tube 11 and includes an output terminal 23 connected between differentiating resistor 22 and capacitor 21.

Neon tube 11 contains two electrodes and a quantity of neon gas sealed within a glass envelope, tube 11 normally constituting an electrical open circuit across its two electrodes. However, upon application of a sufficient potential difference across the two electrodes, ionization of the neon gas molecules occurs and, after formation of sufficient ions, current conduction is initiated between the electrodes.

Upon conduction, the potential drop across the neon tube decreases from a firing level, that is the potential difference required to initiate conduction, to a conducting level, the conducting level remaining substantially constant for a wide variation of current flow through the tube. For a majority of commercially available neon tubes, hereafter referred to as commercial neon tubes, the firing level is of the order of 80 to 90 volts, while the conducting level is approximately 50 volts.

When the applied potential is removed, the current flow through the tube ceases, leaving a quantity of charged ions, the number of ions decreasing rapidly with time. If, immediately after removal, the potential were reapplied, the tube would fire at an applied potential of over 50 volts, but considerably less than the 80 to 90 volts normally needed to fire a "cold" neon tube, that is, a neon tube initially having no charged ions therein. This result follows from the fact that the firing potential is no longer required to generate all of the required number of ions before firing occurs, since charged ions remain from the previous conduction period. As the interval of time between the end of the previous conduction period and the instant of reapplication of the firing potential increases, the number of remaining charged ions decreases, and the reapplied potential must rise to refire the tube.

Figure 2:
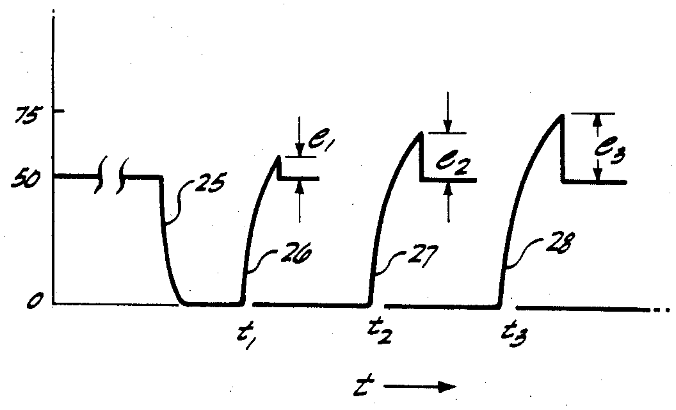
Fig. 2 is a group of potential waveforms illustrating the firing behavior of a neon tube.

This phenomenon is graphically illustrated in Fig. 2 for the commercial neon tubes. Here, the waveform of the potential drop, generally designated 25, across a conducting neon tube is illustrated as the applied potential is removed. Along the time axis, various potentials are illustrated as reapplied across the neon tube at different time intervals after termination of the originally applied potential. Thus, a potential, as indicated at 26, is applied at a time $t_1$ shortly after waveform 25 reaches 0 volts. Potential 26 must rise to slightly more than the 50 volts normal conducting potential of the neon tube before the tube fires. The magnitude of the difference between the maximum applied or firing potential and the conducting potential is designated by $e_1$ which is, in this particular example, relatively small. In the same manner, the potentials, designated 27 and 28, are illustrated as applied across the neon tube at increasingly greater time intervals $t_2$ and $t_3$, respectively, and must rise to increasingly greater potentials $e_2$ and $e_3$, respectively, above the normal conducting potential of 50 volts before firing takes place. Those neon tubes having a firing potential only slightly in excess of their conducting potential, regardless of the time interval from their previous conduction period, are hereafter referred to as ideal neon tubes.

Figure 3:
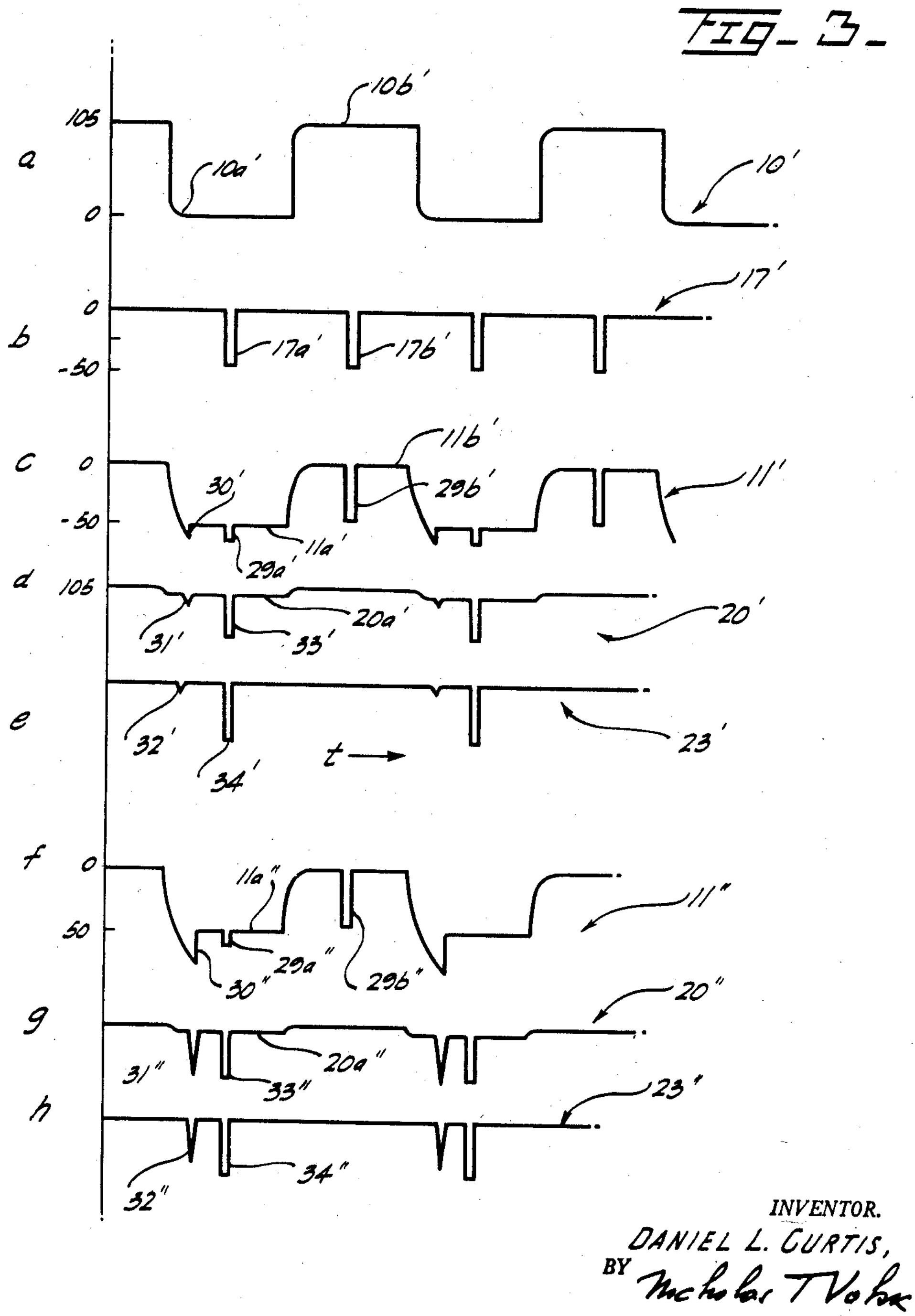

Referring now to Fig. 3, there is illustrated a group of waveforms revealing the operational characteristics of the gating circuit according to Fig. 1. In Fig. 3*a*, the output signal, generally designated 10′, produced by flip-flop 10, comprises alternate high and low voltage levels of 105 and 0 volts, respectively. In Fig. 3*b*, the output signal, generally designated 17′ of oscillator 17, includes a series of pulses occurring, by way of example, substantially in the middle of the successive voltage level intervals, respectively, of signal 10′, each of the pulses having a magnitude of 50 volts. In Fig. 3*c*, the signal generally designated 11′, is the signal appearing across neon tube 11, as measured between junction points 19 and 20, while in Fig. 3*d*, the signal generally designated 20′ is the signal appearing between junction point 20 and ground. The output signal, generally designated 23′, of the gating circuit appearing on output terminal 23, is illustrated in Fig. 3*e*.

When flip-flop 10 is producing its high voltage level of 105 volts on conductor 15, as before the first low voltage level 10*a*′ of signal 10′, the potential difference across neon tube 11 is of 0 volts magnitude since the voltage of junction 20 also is 105 volts. When flip-flop 10 produces its first low voltage level 10*a*′, the potential difference across neon tube 11 increases negatively as measured from junction point 19 to junction point 20, as illustrated by level 11*a*′ of signal 11. The fall to level 11*a*′ is not as rapid as the downward drop of the output voltage of flip-flop 10 since a portion of the flip-flop's energy is shunted to ground through decoupling capacitor 14 and the relatively low output impedance of blocking oscillator 17.

If it is assumed that ions will remain from the previous conduction period, the potential difference across neon tube 11 continues to increase until just in excess of 50 volts, at which time tube 11 fires and signal 11′ instantaneously returns to the 50 volt conducting level, as indicated at 30′. This instantaneous return of signal 11′ appears as a pulse 31′ of signal 20′ at junction point 20, owing to the constant voltage characteristic of neon tube 11, and as slight pulse 32′ of signal 23′ on output terminal 23.

The period of conduction of neon tube 11 is indicated by the flat portion of level 11*a*′ of signal 11′ having approximately 50 volts potential. During this conduction period, the current flow from the 105 volt positive terminal to flip-flop 10 produces, besides the 50 volt potential drop across neon tube 11, a 55 volt drop across resistors 12, 13 and 16. The value of resistor 16 is made approximately one-fifth that of resistors 12 and 13 and the potential drop thereacross owing to this current flow, is of the order of 10 volts, as is illustrated by the flat portion of level 20*a*′ of signal 20′ having approximately 95 volts potential.

The first pulse 17*a*′ of input signal 17′ occurs in the middle of first level 11*a*′ of signal 11′ and is conducted to junction 19 through capacitor 18. Input pulse 17*a*′, at junction 19, has two parallel paths of travel, one through neon tube 11 and resistor 16 to the 105 volt terminal and ground and the other through resistor 13 and decoupling capacitor 14 to ground. Capacitor 14 shunts to ground the portion of the input pulse directed thereto to prevent it from triggering flip-flop 10 through the output circuit thereof. The portion of pulse 17*a*′ conducted along the other path appears partly across neon tube 11 as pulse 29*a*′ of signal 11′, the remaining portion appearing across resistor 16 as a pulse 33′ of signal 20′. Pulse 29*a*′ results from the fact that neon tube 11 is not a perfect constant potential device, especially with respect to signals of rapid rise time, and presents a finite value of impedance thereto. However, by carefully selecting the circuit parameters, pulse 29*a*′ may be made approximately one-fourth of the magnitude of pulse 33′. Pulse 33′ is differentiated by differentiating capacitor 21 and resistor 22 and appears as a pulse 34′ of output signal 23′ on output terminal 23.

When flip-flop 10 produces its next high voltage level 10*b*′, the potential difference across neon tube 11 returns to 0 volt with a corresponding cessation of conduction as is illustrated by level 11*b*′ of signal 11′. The next negative pulse 17*b*′ from oscillator 17, occurring during this 0 voltage level, is blocked by the neon gating circuit since neon tube 11 is an open circuit device in its non-conducting state. Accordingly, all of pulse 17*b*′ appears across the electrodes of the tube as is illustrated by the pulse 29*b*′ of signal 11′. Although the potential of the pulses, as illustrated, is only 50 volts negative, the pulses would not, even if of a much greater magnitude, i. e., 100 volts negative, fire neon tube 11 owing to their extremely short duration. The required firing potential must be applied across a neon tube for a definite interval of time before the gas therein is ionized sufficiently for the tube to fire. The gating signal, that is the signal which closes the gating circuit by producing conduction through neon tube 11, may be considered to be the low voltage level of flip-flop 10 taken in conjunction with the 105 volt source of positive potential whereby the total potential difference across neon tube 11 exceeds the firing potential thereof.

The gating circuit of Fig. 1, when employing ideal neon tubes, that is, those neon tubes whose firing and conducting potentials are relatively close together, operates satisfactorily for gating signals of either infrequent or frequent occurrence, hereafter referred to as low and high gating signal frequencies, respectively. If however, a commercial neon tube is employed in the gating circuit shown in Fig. 1, the gating circuit is primarily useful when the frequency of the gating signals, produced by flip-flop 10, lies within a frequency range of from 3 to 50 kilocycles, the upper frequency limit being determined by each passed input pulse's time relationship with respect to the termination of its corresponding gating signal. In general, the maximum gating frequency of 50 kilocycles may be employed when the input pulses to be passed occur substantially simultaneously with the termination of their respective gating signals.

Stated differently, each new gating signal must be applied from flip-flop 10 across neon tube 11 within at least 330 microseconds but not less than, under the above referred to most favorable conditions, 20 microseconds after the termination of the preceding gating signal. At gating frequencies less than 3 kilocycles, the operation is unsatisfactory owing to the production of spurious output signals while the operation is unsatisfactory at gating frequencies higher than 50 kilocycles owing to the slow response speed of the tube.

Figs. 3*c* through 3*e* reveal signals illustrating the satisfactory operation of the neon gating circuit of Fig. 1 employing a commercial neon tube when the frequency of gating signal 10′ lies between 3 and 25 kilocycles, the upper frequency limit being due to the application of each pulse from oscillator 17 during the middle of each gating signal level. These signals also illustrate the operation of a neon gating circuit at any frequency of gating signals under 25 kilocycles when the circuit employs an ideal neon tube, that is one having similar firing and conducting potentials.

Figs. 3*f* through 3*h* illustrate an unsatisfactory operation of a neon gating circuit employing a commercial neon tube with a gating frequency less than 3 kilocycles. The signal appearing across neon tube 11, generally designated 11″, is of the same general shape as was signal 11′ previously described in connection with the higher gating signal frequency. However, owing to the much lower gating signal frequency in this example, the potential of the signal across tube 11 must rise to a higher value before firing occurs. Accordingly, the potential drop 30″ of signal 11″ is of considerably greater magnitude than drop 30′ of signal 11′, and, in turn, produces a much larger negative pulse 31″ of signal 20″. Pulse 31″ corresponds to pulse 31′ of signal 20′ of the previous case, and appears as a spurious pulse 32″ in output signal 23″. An input pulse 17*a*, occurring during level 11*a*″, is passed by the gate and appears as a desired output pulse 34″ of output signal 23″. Spurious pulse 32″ and output pulse 34″ are of the same order of magnitude owing to the large initial magnitude of the potential drop 30″ and are indistinguishable for practical purposes, thereby making the output signal of the gating circuit of Fig. 1 inaccurate.

If blocking oscillator 17 produced positive instead of negative pulses, the gating circuit would be inoperative since each positive pulse, occurring during the time interval neon tube 11 is conducting, would extinguish conduction in the tube by raising the potential of junction point 19 toward the potential of junction point 20. If it is desired to utilize this gating circuit with positive input pulses, oscillator 17 and coupling capacitor 18 should be coupled to junction point 20, while the output differentiating circuit should be coupled to junction point 19. The positive pulses produced when neon tube 11 was conducting would occur primarily across resistor 16 owing to the constant voltage property of the neon tube.

Referring now to Fig. 4, there is illustrated another embodiment of a neon gating circuit according to this invention whereby a commercial neon tube may be satisfactorily employed in a gating circuit for a gating signal frequency range of 0 up to at least 25 kilocycles. The neon gating circuit of this embodiment includes the same structure as the gating circuit according to Fig. 1, the like elements of the two devices herein being given the same numerical designation as before but preceded by the prefix 4. The gating circuit according to Fig. 4 has, in addition to the structure illustrated in Fig. 1, conductive material, such as an "aquadag" coating 36 on the glass envelope of neon tube 411. The "aquadag" coating in this example is a deposit of finely divided graphite particles on the outer glass surface of the tube envelope. The other output terminal of bistable flip-flop 410, which produces a signal complementary to signal 10′ of Fig. 2 and is not illustrated in Fig. 1, is connected through a conductor 38 and a resistor 35 to "aquadag" coating 36. The lead capacitance to ground of the connection from conductor 38 to coating 36 is illustrated by a capacitance 37, herein shown dotted.

Reference to the curves illustrated in Fig. 5 taken in conjunction with the signals of Figs. 3*a* through 3*c* best illustrate how satisfactory operation of a commercial neon tube in a gating circuit at gating frequencies below 3 kilocycles as well as at the higher frequencies, is accomplished. In particular, assume that gating signal 10′ is decreasing from its high voltage level of 105 volts to the low voltage level 10*a*′ of 0 volts, as illustrated in Fig. 3*a*. This fall of potential on output conductor 415 corresponds to an equivalent rise of the potential applied from the other output conductor 38 of flip-flop 410 to "aquadag" coating 36 and the voltage on "aquadag" coating 36, generally designated 36′ in Fig. 5, accordingly rises from a 0 value to 105 volts positive.

Immediately preceding level 10*a*′ of signal 10′, the inner surface of the glass envelope of neon tube 411 was 105 volts positive with respect to ground owing to the 105 volt potential applied to both of the electrodes thereof. Upon the rise of potential 36′ on "aquadag" coating 36, as produced by the subsequent triggering of flip-flop 410, the inner surface of the glass envelope of neon tube 411 is correspondingly elevated above 105 volts through condenser action between the surface and the "aquadag" coating 36. This potential rise above 105 volts of the inner glass surface of the neon tube, generally designated 39 in Fig. 5, occurs simultaneously with the decrease of the potential applied from conductor 415 to one electrode of neon tube 411 as is indicated at 411′ in Fig. 5. The potential difference of potentials 39 and 411*a*′ produces ionization of the neon gas independent of the ionization produced by the potential difference existing across the neon tube electrodes. This additional ionization is effective, if produced at the correct time, to allow the firing of neon tube 411 to take place much sooner than would have been possible had the only ionization produced been through the potential difference existing across its electrodes. Accordingly, the potential appearing across neon tube 411, generally designated 411a' in Fig. 5, rises only slightly above 50 volts, at which time $t_1$, conduction occurs owing to the additional ionization afforded the neon gas by potential 39. Neon tube 411 then assumes its normally conducting potential of 50 volts.

For comparison purposes, the potential across neon tube 411 without "aquadag" coating 36 for low frequency gating signals is illustrated at 411b' in Fig. 5 and is similar to that illustrated for the low frequency operation of the gating circuit of Fig. 1 employing a commercial neon tube as shown in Figs. 3f–3h. Thus, potential 411b' must rise to approximately 80 volts at a time $t_2$ before neon tube 411 conducts and is similar to level 11a'' of signal 11'' of Fig. 3f. It is thus seen that "aquadag" coating 36, when maintained at the potential of the other flip-flop output conductor 38, allows gating operations to be performed at extremely low gating frequencies without production of spurious output pulses.

The value of resistor 35 of Fig. 4 is determined by the rise time of the potential across neon tube 411 when flip-flop 410 triggers into its low voltage level on conductor 415. As has been stated previously, this applied potential does not rise as fast as the potential output of flip-flop 410 owing to the shunting effect of both decoupling capacitor 414 and the low output impedance of oscillator 417. It is, therefore, necessary that the potential applied to the "aquadag" coating 36 from output terminal 38 of flip-flop 410 be delayed approximately the same amount. If no such delay were introduced, the potential of signal 39 would rise in a substantially instantaneous manner to its maximum value through the beforementioned condenser action and then return to 105 volts. The ions thus produced would have time to deionize before time $t_1$ were reached with the result that the operation of the gating circuit of Fig. 4 at low frequency gating signals would be similar to that described for the gating circuit of Fig. 1 in Figs. 3f–3h.

To alleviate this difficulty, a resistor 35 is incorporated in the conducting path between output conductor 38 of flip-flop 410 and "aquadag" coating 36 to delay the rise time of the potential 36' of Fig. 5. Resistor 35 should be so related in value to the lead-to-ground capacitance 37 that the peak of the additional ionization produced by signal 39 is reached concurrently with the attainment of 50 volts by signal 411. With this condition fulfilled, neon tube 411 will begin conducting at an applied potential only slightly higher than the conducting potential as at 411a' of Fig. 5.

Fig. 6 discloses one combination of "and" and "or" gating circuits employing the principles of the present invention as might be suitable for use in digital computer operations. It is to be understood that the particular combination shown is not exhaustive of possible combinations but is intended only as illustrative of the principles involved.

In particular, there is illustrated in Fig. 6, two "and" gate circuits 40 and 41, the outputs of which are applied to the inputs of an "or" gate circuit 42. The output of "or" gate circuit 42 is, in turn, applied as gating signals to a neon gating circuit 43 of the type illustrated in Fig. 4. "And" gate circuit 40 comprises a bus 47 connected to the positive terminal of a 300 volt source of potential (not shown) through a resistor 48. A neon tube 50 is connected between bus 47 and one output terminal of a flip-flop 51, while a neon tube 52 is connected between bus 47 and one output terminal of a flip-flop 53.

"And" gate circuit 41, similar to circuit 40, includes a bus 55 connected to the positive terminal of the 300 volt source through a resistor 56. A neon tube 58 is connected between bus 55 and one output terminal of a flip-flop 59, and a neon tube 60 is connected between bus 55 and the output terminal of flip-flop 53 which was connected to neon tube 52.

"Or" gate circuit 42 comprises a neon tube 65 connected between a bus 64 and bus 47 of circuit 40, and another neon tube 66 connected between bus 64 and bus 55 of circuit 41. Bus 64 of circuit 42 is connected to a positive terminal of a 20 volt source of potential (not shown) through a resistor 67.

The neon gating circuit 43 comprises a neon tube 69, one electrode of which is connected through a resistor 70 to bus 64, and the other electrode of which is connected to ground through a resistor 71. Blocking oscillator 617 and coupling capacitor 618, corresponding to oscillator 17 and capacitor 18 of Fig. 1, are coupled to the junction of neon tube 69 and resistor 71. Differentiating capacitor 621 and resistor 622, corresponding to capacitor 21 and resistor 22 of Fig. 1, are included in gating circuit 43, capacitor 621 being connected to the junction of resistor 70 and neon tube 69. Output terminal 623, corresponding to terminal 23 of Fig. 1, is connected to the junction of differentiating resistor 622 and capacitor 621.

The combination, as described, would operate satisfactorily if ideal neon tubes are used. However, if commercial neon tubes are to be employed, it is necessary to incorporate additional structure similar to that employed in the gating circuit of Fig. 4. Accordingly, each neon tube has an "aquadag" coating, each coating being supplied with a potential of correct magnitude and polarity as is necessary for low speed operation of the device. These potentials are produced by a flip-flop 73, one input terminal of which is connected directly to the output terminal of blocking oscillator 617, the other input terminal being connected through a delay means, such as delay line 72, to the output terminal of oscillator 617. One output conductor 74 of flip-flop 73 is connected to the "aquadag" coating on neon tubes 50, 52, 58 and 60 through resistors 75, 76, 77 and 78, respectively, while the other output conductor 79 of flip-flop 73 is connected to the "aquadag" coatings on neon tubes 65, 66 and 69 through resistors 80, 81 and 82, respectively.

The operation of the device according to Fig. 6 may be best explained by reference to the waveforms illustrated in Fig. 7. Each of the output signals of flip-flops 51 and 53, generally designated 51' and 53', respectively, in Fig. 7, contains low and high voltage levels of zero and 90 volts, respectively. By way of example, signal 51' contains a first high voltage level 51a of 90 volts followed by a second low voltage level 51b of 0 volts followed, in turn, by a high voltage level 51c. Signal 53' contains a first low voltage level 53a followed by two contiguous high voltage levels 53b and 53c. During the interval that flip-flop 53 is producing level 53a, neon tube 52 conducts and current flows from the 300 volt source through resistor 48, bus 47, and neon tube 52 to the output terminal of flip-flop 53. The signal on bus 47, generally designated 47' in Fig. 7 is during this interval, at 50 volts positive, as indicated by the first level 47a, owing to the 50 volt potential drop across neon tube 52.

During the next interval, signal 51' falls to level 51b of zero potential whereas signal 53' rises to the high potential level 53b. The 50 volt potential on bus 47 remains unchanged during this period, as is indicated by level 47b of signal 47', since conduction now takes place from the 300 volt source to flip-flop 51 through resistor 48 and the other neon tube 50.

During the next interval, the potential of signal 53' remains unchanged as indicated by level 53c' whereas signal 51' returns to high voltage level 51c. When flip-flops 51 and 53 are simultaneously producing their high voltage level, current will flow thereto from bus 47 and neon tubes 50 and 52, respectively. The potential of bus 47 will thereby be elevated to a 140 volt potential, as indicated by level 47c of signal 47', owing to the 50 volt drop across neon tubes 50 and 52 and the 90 volt output potential produced by flip-flops 51 and 53.

Whenever the potential of bus 47 is 50 volts, as for example, levels 47a or 47b of signal 47', neon tube 65 is non-conducting since bus 64 is at 20 volts positive, owing to the 20 volt source, and only a 30 volt potential drop exists across the tube. However, when the potential on bus 47 rises to the high voltage level of 140 volts, as shown by level 47c, neon tube 65 conducts and the potential of bus 64, generally designated 64' in Fig. 7, is elevated from 20 volts, as indicated by level 64b, to 90 volts as indicated by level 64c, the 90 volts being the difference between the 140 volt potential on bus 47 and the 50 volt potential drop across neon tube 65. The 90 volt potential on bus 64, in turn, produces conduction through neon tube 69 and series resistors 70 and 71 thereby opening gating circuit 43. Gating circuit 43 operates similarly to the gating circuit of Fig. 4 in that all pulses produced by oscillator 617 during the period neon tube 69 is conducting appear on output terminal 623. The output signal of blocking oscillator 617, generally designated 617' in Fig. 7, comprises, by way of example, a series of pulses occurring at regular intervals intermediate the voltage levels produced by flip-flops 51, 53, and 59. Thus, pulse 617c, produced by oscillator 617 during level 47c, is passed by gating circuit 43 and appears as a pulse 623c of the output signal on terminal 623, generally designated 623' in Fig. 7.

By way of summary then, when flip-flops 51 and 53 simultaneously produce their high voltage level, current flows between the 300 volt source and ground through neon tube 65 of circuit 42 and neon tube 69 thereby opening gating circuit 43. Thus, any negative pulses produced by oscillator 617 during this interval are passed by gate 43 and appear on output terminal 623. During the interval that either or both flip-flops 51 and 53 are producing their low voltage level, neon tube 65 does not conduct and electrically isolates circuit 40 from the remaining circuitry.

It will be herein noted that the essential difference between gating circuit 43 of Fig. 6, and the gating circuit of Fig. 1, is that resistor 71, corresponding to resistor 16 of Fig. 1, is connected to ground instead of a source of positive potential. Accordingly, neon tube 69 conducts when the potential of the signal on bus 64 rises to its high, rather than its low voltage level as was the case in Fig. 1. Thus, for satisfactory operation, it is necessary to apply the negative pulses from oscillator 617 to the junction point between neon tube 69 and resistor 71, corresponding to junction point 20 of Fig. 1, rather than the junction point between resistor 70 and neon tube 69, corresponding to junction point 19 of Fig. 1. This is done so that the negative pulses, when applied to the gating circuit, will accentuate rather than extinguish conduction in neon tube 69 when it is conducting. Positive pulses may be utilized in the gating circuit 43 if the connections of oscillator 617 and the output differentiating circuit to the tube electrode are reversed in the manner explained for the gating circuit of Fig. 1.

The operation of circuit 41 is similar to the operation of circuit 40, as may be seen by reference to the signal on bus 55, generally designated 55' in Fig. 7, and the output signals of flip-flops 59 and 53, generally designated 59' and 53', respectively, in Fig. 7. As was the case for circuit 40, whenever flip-flops 53 and 59 simultaneously produce their high voltage level, as is illustrated by levels 59f and 53f, of signals 59' and 53', respectively, signal 55' is at the high voltage level 55f of 140 volts. During the interval of level 55f, current flows from the 300 volt source through resistor 56, bus 55, neon tube 66, bus 64, resistor 70, neon tube 69 and resistor 71 to ground. Accordingly, pulse 617f, produced by oscillator 617 during level 55f, appears on output terminal 623 as pulse 623f of signal 623'.

The function of "or" gate circuit 42 is to produce conduction through neon tube 69 to open gate circuit 43 whenever the potential on either bus 47 or 55 of "and" gate circuits 40 and 41, respectively, is high. Also, "or" gate circuit 42 electrically isolates the two "and" gate circuits 40 and 41 from each other, since either neon tube 65 or 66, while nonconducting, is an open circuit device.

As has been stated previously, the "aquadag" coatings and potentials applied thereto are for use with commercial neon tubes in order that the gating circuit combination of Fig. 6 might operate satisfactorily at low gating frequencies. Thus, signal 617' is applied to one input terminal of flip-flop 73 and each pulse thereof triggers the flip-flop so that its high voltage level appears on output conductor 79 and its low voltage level appears on conductor 74. Each triggering pulse is also delayed one-half of a timing interval, that is one-half of the period of signal 617', by delay line 72 and the delayed pulses, generally designated 72' in Fig. 7, are applied to the other flip-flop input terminal. Each delayed pulse of signal 72' triggers flip-flop 73 so that its high voltage level appears on output conductor 79 and its low voltage level appears on output conductor 74. Thus, each pulse in signal 617' initially triggers flip-flop 73 into one state and then, after being delayed for one-half of a timing interval, triggers flip-flop 73 into its other state. Therefore, the signals appearing on conductors 74 and 79, generally designated 74' and 79', respectively in Fig. 7, comprise two complementary square waves each having the frequency of the pulse repetition rate of signal 617'.

The purpose served by the "aquadag" coatings on the commercial neon tubes within "and" gate circuits 40 and 41 and the potentials applied thereto, is to prevent the opening of gate 43 when, in either "and" gate circuit 40 or 41, the output signal from one flip-flop changes from its high to its low voltage level simultaneously when the output signal from the other flip-flop changes from its low to high voltage level rather than preventing spurious output pulses on output terminal 623. For example, when flip-flop 51 is producing high voltage level 51a of signal 51′ and flip-flop 53 is producing low voltage level 53a of signal 53′, neon tube 52 is conducting and neon tube 50 is nonconducting. Upon the change of signals 51′ and 53′ into the low and high voltage levels 51b and 53b, respectively, neon tube 50 begins conduction and neon tube 52 stops conduction. Neon tube 50 must fire before flip-flop 52 ceases conduction, otherwise the potential on bus 47 will rise to 300 volts for the time interval that both neon tubes are nonconducting. As is apparent, a potential of 300 volts on bus 47 would open gate 43 with the result that any signals produced by oscillator 617 during that time interval would be passed to output terminal 623. This undesired operation is prevented by applying signal 74′ from flip-flop 73 to the "aquadag" coatings on neon tubes 50 and 52 through resistors 75 and 76, respectively, of appropriate value, to allow a rapid firing of neon tube 50 in this example.

As will be observed, signal 74′ falls to its low voltage level each time either signal 51′ or 53′ changes from one voltage level to the other, the reason being that flip-flop 73 is triggered at least twice for each triggering of either flip-flop 51 or 53. Thus, during the interval that the potential of signal 51′ is decreasing to level 51b, the potential of signal 74′ applied to the "aquadag" coating is increasing which fires neon tube 50 at just slightly above 50 volts in a manner similar to that described for the gating circuit according to Fig. 4. Neon tube 50 will thus fire simultaneously with the conclusion of conduction of neon tube 52 thereby preventing the undesired opening of gating circuit 43 referred to above.

Signal 79′ is applied to the "aquadag" coatings on commercial neon tubes 65 and 66 in "or" gate circuit 42 to accelerate the speed of response thereof upon elevation of the potential on either bus 47 or bus 55. During the interval that the potential on bus 47 is rising to 140 volts, as for example, level 47c of signal 47′, signal 79′ applied to the "aquadag" coating on neon tube 65 is falling to its low voltage level. As was the case described for the gating circuit of Fig. 4, the potential change applied to the "aquadag" coating is opposite to the potential change within the tube, thereby producing a rapid evolution of ions by reason of the increase of potential difference between the two. The rapid production of ions, in turn, accelerates the tube conduction so that only a minimum time delay is introduced by "or" gate circuit 42 in opening gating circuit 43.

The "aquadag" coating on a commercial neon tube 69 and the application of signal 79′ thereto serves the identical function for gate circuit 43 as did the "aquadag" coating and signal applied thereto for the gating circuit of Fig. 4 in that no spurious output signal is produced on output terminal 623 whenever neon tube 69 fires. Thus, whenever signal 64′ rises to its high voltage level, signal 79′ is falling to its low voltage level and the resulting potential difference between the "aquadag" coating on neon tube 69 and the neon gas therein accelerates the tube's firing.

As is apparent, if ideal neon tubes were employed in the gating circuit combination of Fig. 6, the rapid firing of such tubes would alleviate the necessity for the "aquadag" coatings and potentials applied thereto as is herein illustrated. As is also apparent to those skilled in the art, many possible combinations exist of "and" and "or" gate circuits comprising the neon gating circuits of this invention, the operation and design of which are obvious from the example illustrated in Fig. 6.

Referring now to Fig. 8a, there is here illustrated another embodiment of this invention wherein suitable operation of commercial neon tubes may be had in neon gating circuits for low frequency gating signals. Only a portion of the neon gating circuit of Fig. 1, is again illustrated, this portion comprising neon tube 11 between junction points 19 and 20, and including, in addition, a source of radio-frequency electromagnetic energy, such as oscillator 82, the output signal of which is applied to a coil 83 positioned adjacent neon tube 11. The energy from coil 83 which intercepts the neon gas within tube 11 produces a continuous ionization of a portion of the molecules thereof. Thus, upon application of a gating signal from flip-flop 10, tube 11 will fire owing to the ionization produced therein by the radio-frequency energy, at an applied potential of just slightly over 50 volts. Consequently, spurious output pulses characteristic of the gating circuit of Fig. 1 will not be produced by the firing of neon tube 11 by low frequency gating signals.

The radio-frequency energy intercepted by neon tube 11 in this embodiment must be carefully adjusted. If the amount intercepted is too small, spurious output pulses will still be produced by the applied gating signals owing to a lack of sufficient ionization. If the amount intercepted is too great, then input gating pulses from source 17 will be passed through the tube due to the large number of ions therein regardless of whether a gating signal is present or not. This adjustment may be made by either varying the position of coil 83 relative to neon tube 11 or by varying the magnitude of the output signal from oscillator 82.

In Fig. 8b, there is illustrated another embodiment of this invention similar to that illustrated in Fig. 8a. Here also, only a portion of the gating circuit of Fig. 1, including neon tube 11 between junction points 19 and 20 is shown, the circuit having, in addition, a quantity of radioactive substance 84 adjacent tube 11. Substance 84 serves the same purpose as does the radio-frequency energy applied to neon tube 11 in the gating circuit of Fig. 8a, that is the bombardment of the neon gas molecules by the radioactive substance 84 produces a continuous ionization thereof. This ionization, in turn, permits tube 11 to conduct at just above a 50 volt potential difference between junction points 19 and 20 upon application of a gating signal.

The quantity of ionization produced by substance 84 must be within certain limits in order to provide proper operation of the circuit. This may be done by choosing the proper type and amount of radioactive substance and adjusting its position relative to neon tube 11 to the proper distance. Also, substance 84 may be placed within the glass envelope of neon tube 11, preferably during the manufacture thereof, if so desired, to secure the proper continuous ionization.

As will be apparent to those skilled in the art, either of the embodiments illustrated in Figs. 8a or 8b may be substituted for the "aquadag" coatings and potentials applied thereto in the gating circuit combination of Fig. 6 when commercial neon tubes are employed therein.

As will also be apparent to those skilled in the art, other types of gaseous discharge devices capable of passing current at a reasonably constant voltage drop, such as voltage regulator tubes, may be employed in the gating circuit of this invention, in addition to the commercial and ideal tubes herein specifically illustrated.

What is claimed as new is:

1. An electrical gating circuit for passing electrical input pulses upon occurrence of an electrical gating signal of at least a predetermined voltage, said circuit comprising: a neon tube having first and second electrodes and responsive to a signal of said predetermined voltage applied across said electrodes for conducting current at a substantially constant voltage drop, said constant voltage drop being less than said predetermined voltage; an electrical resistance element conductively coupled to said first electrode; means for applying the gating signal across the combination of said neon tube and said resistance element; means for applying the input pulses to one of said electrodes, the input pulses applied during the occurrence of a gating signal being passed by said neon tube and appearing as output pulses on the other of said electrodes; and an output circuit conductively coupled to said other electrode for passing the pulses appearing thereon and blocking the gating signal.

2. An electrical gating circuit for passing electrical input pulses upon occurrence of an electrical gating signal of at least a predetermined voltage, said circuit comprising: a gaseous discharge device having first and second electrodes and responsive to a signal of said predetermined voltage applied across said electrodes for conducting current at a substantially constant voltage drop, said constant voltage drop being less than said predetermined voltage; an electrical resistance element conductively coupled to said first electrode; means for applying the gating signal across the combination of said gaseous discharge device and said resistance element; means for applying the input pulses to one of said electrodes, the input pulses applied during the occurrence of a gating signal being passed by said gaseous discharge device and appearing as output pulses on the other of said electrodes; and means for lowering the voltage of the signal said gaseous discharge device is responsive to for conducting current whereby the voltage difference between said constant voltage drop and the lowered response voltage is substantially reduced.

3. The gating circuit defined in claim 2, wherein the last-named means includes a radioactive substance positioned adjacent said gaseous discharge device.

4. The gating circuit defined in claim 2, wherein the last-named means includes conducting means surrounding a portion of said gaseous discharge device, means for producing a signal synchronously related to the gating signal, said synchronously-related signal changing in potential upon each occurrence of the gating signal in a polarity opposite to that applied by the gating signal to the gas in said gaseous discharge device, and means for applying said synchronously-related signal to said conductive means.

5. The gating circuit defined in claim 4, wherein said gaseous discharge device is a neon tube.

6. An electrical gating circuit comprising: a gaseous discharge device having first and second electrodes and normally responsive to a signal of a predetermined voltage applied across said electrodes for conducting current at a constant voltage drop, said constant voltage drop being less than said predetermined voltage; a signal source for producing alternate high and low voltage signals; means conductively coupling said signal source to said first electrode; a source of positive voltage, the voltage difference between the positive voltage and the low voltage signal being greater than said predetermined voltage, and the voltage difference between the positive voltage and the high voltage signal being less than said predetermined voltage; an electrical resistive element conductively coupled between the positive voltage source and said second electrode; said gaseous discharge device conducting current whenever the signal source produces said low voltage signal; a pulse source; means for producing alternate low and high voltage signals synchronously with the high and low voltage signals, respectively, produced by said signal source; conductive means surrounding a portion of said gaseous discharge device; means for applying the alternate low and high voltage signals to said conductive means whereby said predetermined voltage is lowered and the voltage difference between said constant voltage drop and said predetermined voltage is substantially reduced; and means for applying the pulses from said pulse source to one of said electrodes, the pulses occurring during current conduction of said gaseous discharge device appearing on the other electrode of said gaseous discharge device as output pulses.

7. The device defined in claim 6, including in addition an electrical output circuit coupled between the other electrode and ground.

8. An electrical gating circuit for passing electrical input pulses upon occurrence of an electrical gating signal of a predetermined voltage, said circuit comprising: a gaseous discharge device having first and second electrodes and being rendered conductive by a firing signal voltage applied across said electrodes, said firing signal voltage normally being greater than said predetermined voltage; first means for applying the gating signal across said gaseous discharge device; second means coupled to said gaseous discharge device for lowering the firing signal voltage at least to said predetermined voltage; and means for applying the input pulses to one of said electrodes, the input pulses applied during conduction of said gaseous discharge device being passed by said gaseous discharge device and appearing as output pulses on the other of said electrodes.

9. The gating circuit defined in claim 8 wherein said second means includes radiating means for enveloping said gaseous discharge device with radio-frequency energy.

10. The gating circuit defined in claim 8 wherein said second means includes a radioactive substance positioned adjacent said gaseous discharge device.

11. The gating circuit defined in claim 8 wherein said second means includes a conductive coating surrounding at least a portion of said gaseous discharge device and means responsive to the gating signal for applying a voltage to said coating.

12. An electrical gating circuit for passing electrical input pulses upon occurrence of an electrical gating signal of at least a predetermined voltage, said circuit comprising: a gaseous discharge device having first and second electrodes and being normally rendered conductive by a firing signal voltage greater than said predetermined voltage applied across said electrodes; first means for applying the gating signal across said gaseous discharge device; second means responsive to the gating signal for lowering the firing signal voltage at least to said predetermined voltage; and means for applying the input pulses to one of said electrodes, the input pulses applied during conduction of said gaseous discharge device appearing as output pulses on the other of said electrodes.

13. The gating circuit defined in claim 1 wherein said output circuit comprises a differentiating network.

14. The gating circuit defined in claim 2 wherein the last-named means includes a source of radio-frequency energy, and radiating means conductively coupled to said energy source for enveloping said gaseous discharge device with said radio-frequency.

15. An electrical gating circuit comprising: a source of electrical gating signals, each of said gating signals being of at least a predetermined voltage; a gaseous discharge device having first and second electrodes and responsive to a signal of said predetermined voltage applied across said electrodes for passing current at a substantially constant voltage drop; an electrical resistive element having first and second ends; means conductively coupling said first end to said first electrode; means for applying the gating signals from the gating signal source between said second end of said element and said second electrode; a pulse source; and means for applying the pulses from said pulse source to one of the electrodes, the pulses produced by said pulse source during the time intervals said gaseous discharge device is conducting appearing on the other electrode of said gaseous discharge device as output pulses.

16. The device of claim 6 wherein said gaseous discharge device comprises a neon tube and said conductive means comprises a conductive coating on said neon tube.

17. In combination: first and second sources of alternate high and low voltage level signals; a first source of positive potential; an "and" gate including first and second gaseous discharge devices, each of said devices having first and second electrodes, means conductively coupling the first and second sources of voltage level signals to the first electrodes of said first and second gaseous discharge devices, respectively, and means conductively coupling the second electrode of each of said first and second gaseous discharge devices to the first potential source, said second electrodes being maintained at a first voltage when said first and second sources simultaneously produce the high voltage levels; a third gaseous discharge device having first and second electrodes; a second source of potential; an electrical resistive element conductively coupling the second electrode of said third gaseous discharge device to said second source of potential; means conductively coupling the first electrode of said third discharge device to the second electrodes of said first and second gaseous discharge device, said third gaseous discharge device being responsive to said first voltage for conducting current between the electrodes thereof, the second electrode being maintained at a second voltage during the conduction thereof, said second voltage being greater than the potential magnitude of said second source; a gating circuit comprising a fourth gaseous discharge device having first and second electrodes, and an electrical resistive element coupled between the second electrode of said fourth gaseous discharge device and ground; means coupling the second electrode of said third gaseous discharge device to the first electrode of said fourth gaseous discharge device, said fourth gaseous discharge device being responsive to said second voltage for conducting current between the electrodes thereof; a pulse source; means for applying the pulses of said pulse source to one of the electrodes of said fourth gaseous discharge device; and an output circuit coupled to the other electrode of said fourth gaseous discharge device, the pulses produced by said pulse source during the time interval said fourth gaseous discharge device is conducting appearing across said electrical resistive element.

18. The combination according to claim 7 wherein each of said first, second, third and fourth gaseous discharge devices comprises a neon tube.

DANIEL L. CURTIS.

References Cited in the file of this patent

UNITED STATES PATENTS

| Number | Name | Date |
|---|---|---|
| 2,103,439 | Swart | Dec. 28, 1937 |
| 2,502,443 | Dunn et al. | Apr. 4, 1950 |
| 2,539,594 | Rines et al. | Jan. 30, 1951 |
| 2,572,891 | Smith | Oct. 30, 1951 |